US006938166B1

(12) United States Patent
Sarfati et al.

(10) Patent No.: US 6,938,166 B1
(45) Date of Patent: Aug. 30, 2005

(54) METHOD OF DOWNLOADING OF DATA TO AN MPEG RECEIVER/DECODER AND MPEG TRANSMISSION SYSTEM FOR IMPLEMENTING THE SAME

(75) Inventors: Jean-Claude Sarfati, Epinay sur Seine (FR); Jerome Meric, Senlis (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/400,442

(22) Filed: Sep. 21, 1999

Related U.S. Application Data

(63) Continuation of application No. PCT/EP97/02111, filed on Apr. 25, 1997.

(30) Foreign Application Priority Data

Mar. 21, 1997 (EP) .................................. 97400650

(51) Int. Cl.$^7$ ............................................... H04L 9/00
(52) U.S. Cl. ....................... 713/200; 713/176; 382/116
(58) Field of Search ............................... 380/239, 241, 380/242, 37, 30, 54, 202, 217; 711/216; 709/212, 709/223, 229, 231, 242, 246; 713/200, 201, 713/162, 176, 180, 168; 382/116, 119, 124, 382/218, 219; 705/57, 62, 71

(56) References Cited

U.S. PATENT DOCUMENTS

| 5,231,665 A | 7/1993 | Auld et al. |
| 5,420,866 A | 5/1995 | Wasilewski ............... 370/110.1 |

(Continued)

FOREIGN PATENT DOCUMENTS

| EP | 0 690 400 | 1/1996 | ........... G06F 19/00 |

(Continued)

OTHER PUBLICATIONS

Copy of International Search Report issued Sep. 12, 1997, Application No. PCT/EP97/02111, 3 pages.

(Continued)

*Primary Examiner*—Kim Vu
*Assistant Examiner*—Leynna T. Ha
(74) *Attorney, Agent, or Firm*—Osha • Liang LLP

(57) ABSTRACT

In a digital satellite television system in which a television receives its signal via receiver/decoder, such as a set top box, interactive applications can be downloaded and run on the receiver/decoder. The application code is arranged as modules, and the downloading of modules is preceded by searching a directory module within a specified local address. The modules are signed and the directory module is signed and encrypted so that a single encryption applies to all of the modules making up the application. Multiple public encryption keys are stored in ROM in the receiver/decoder, so that applications can be created by different sources, without the sources needing to know each other's private encryption keys. A facility is provided to enable an encryption key to be temporarily stored in RAM in the receiver/decoder, so that a manufacturer of the receiver/decoder can check its functionality. A signature of the directory may be hidden at a variable position in a block of dummy data in the directory module. An application to be downloaded may be checked against an application validation bitmap stored in the receiver/decoder.

13 Claims, 9 Drawing Sheets

U.S. PATENT DOCUMENTS

| | | | | |
|---|---|---|---|---|
| 5,625,693 | A | * | 4/1997 | Rohatgi et al. ............... 380/23 |
| 5,717,760 | A | * | 2/1998 | Satterfield ................... 380/28 |
| 5,737,599 | A | * | 4/1998 | Rowe et al. .................. 707/10 |
| 5,808,570 | A | * | 9/1998 | Bakhmutsky ................ 341/65 |
| 5,835,035 | A | * | 11/1998 | Bakhmutsky ................ 341/67 |
| 5,930,369 | A | * | 7/1999 | Cox et al. ..................... 380/54 |
| 5,949,885 | A | * | 9/1999 | Leighton ..................... 380/54 |
| 6,014,723 | A | * | 1/2000 | Tremblay et al. ............. 711/1 |
| 6,026,193 | A | * | 2/2000 | Rhoads ....................... 382/232 |
| 6,034,732 | A | * | 3/2000 | Hirota et al. ............... 348/441 |
| 6,148,387 | A | * | 11/2000 | Galasso et al. ............ 711/203 |
| 6,163,842 | A | * | 12/2000 | Barton ....................... 713/176 |
| 6,166,730 | A | * | 12/2000 | Goode et al. ............... 345/327 |
| 6,324,644 | B1 | * | 11/2001 | Rakavy et al. ................. 713/1 |
| 6,438,140 | B1 | * | 8/2002 | Jungers et al. ............. 370/471 |
| 6,496,591 | B1 | * | 12/2002 | Rhoads ....................... 382/100 |
| 6,571,334 | B1 | * | 5/2003 | Feldbau et al. ............. 713/170 |

FOREIGN PATENT DOCUMENTS

| | | | |
|---|---|---|---|
| EP | 0 752 786 A1 | 1/1997 | .......... H04N 7/167 |
| WO | WO 95/15655 | 6/1995 | ............ H04N 7/16 |
| WO | WO 95 33338 | 12/1995 | .......... H04N 7/173 |
| WO | wo 96/31982 | 10/1996 | .......... H04N 7/167 |
| WO | WO 96/38002 | 11/1996 | .......... H04N 7/173 |

OTHER PUBLICATIONS

Copy of European Search Report for European Application No. EP 02 01 3520, issued Sep. 3, 2002, 4 pages.

* cited by examiner

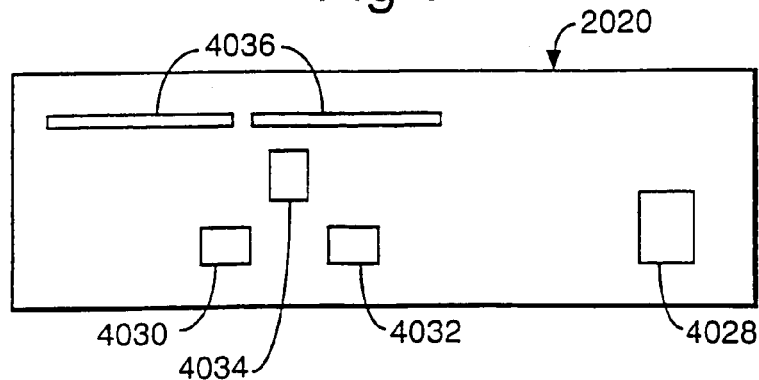
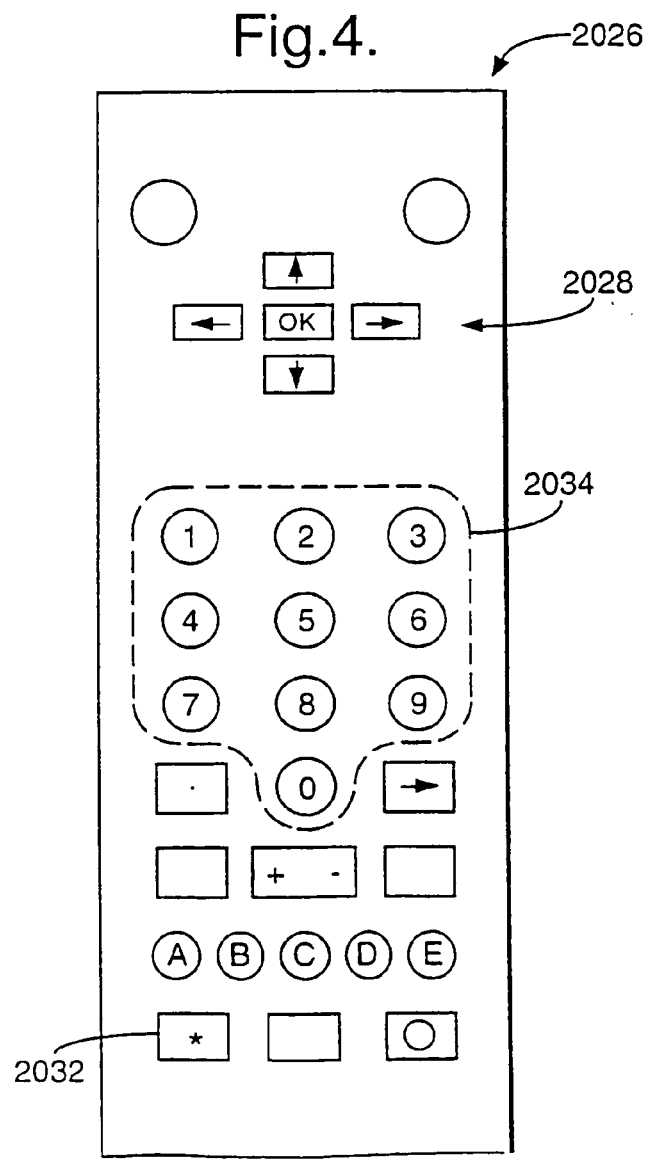

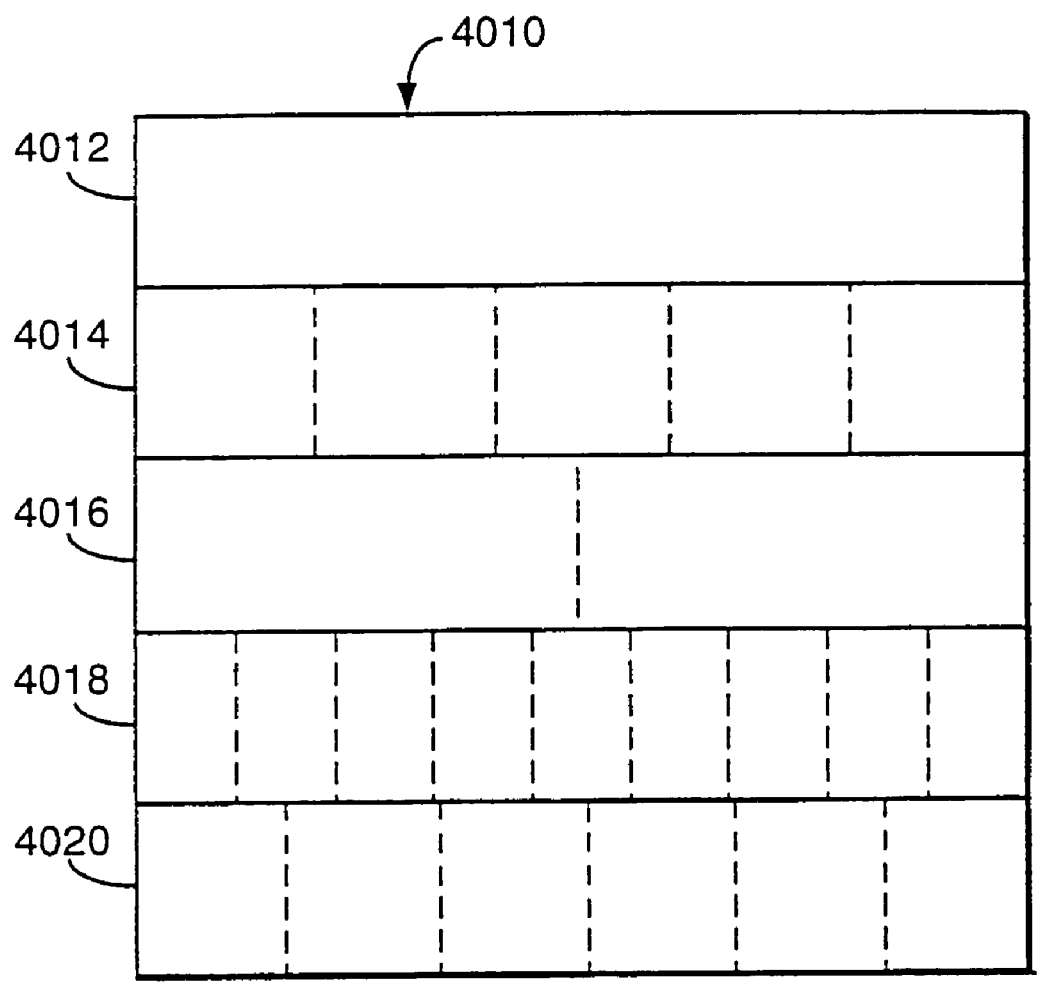

METHOD OF DOWNLOADING OF DATA TO AN MPEG RECEIVER/DECODER AND MPEG TRANSMISSION SYSTEM FOR IMPLEMENTING THE SAME

CROSS-REFERENCE TO RELATED APPLICATIONS

This application is a continuation of PCT Patent Application No. PCT/EP97/02111, filed on Apr. 25, 1997.

This invention relates to:—
a method of downloading data to an MPEG receiver/decoder;
such an MPEG receiver/decoder per se; and
an MPEG transmission system.

The advent of digital transmission systems intended primarily for broadcasting television signals, in particular but not exclusively satellite television systems, has opened up the possibility of using such systems for other purposes. One of these is to provide interactivity with the end user.

One way of doing this is to run an application on the receiver/decoder through which the television signal is received. The code for the application could be permanently stored in the receiver/decoder. However, this would be rather limiting. Preferably, the receiver/decoder should be able to download the code for a required application. In this way, more variety may be provided, and applications can be updated as required without any action on the part of the user.

In an MPEG system, application code may be downloaded in MPEG tables. However, there is a limit on the size of a piece of code which can be downloaded by way of a single MPEG table. Furthermore, if it is required that a whole application is downloaded before it can be run, this may provide a delay which is unacceptable to the user. There is therefore a desire to be able to download an application as a plurality of modules.

However, this then creates the problem of being able to identify and extract from the MPEG bitstream the modules required for a particular application. A first aspect of the present invention is concerned with this problem.

In accordance with a first aspect of the present invention, there is provided a method of downloading at least part of an application to an MPEG receiver/decoder, comprising the steps of: dividing the application into a plurality of modules; formatting each of the modules as a respective MPEG table, the tables having the same table identification ("TID") and respective different table identification extensions ("TID-extensions") other than a predetermined TID-extension; generating a directory MPEG table for the modules having the same said TID and said predetermined TID-extension, the directory containing for each of the modules a name of that module and the respective TID-extension; cyclically transmitting the directory MPEG table and the module MPEG tables in an MPEG bitstream; and at the MPEG receiver/decoder:—receiving the MPEG bitstream; downloading that one of the MPEG tables having the predetermined TID-extension so as to download the directory MPEG table; determining from the content of the directory MPEG table the TID-extensions of the module MPEG tables; and downloading at least one of the module MPEG tables having the same TID as that of the downloaded directory MPEG table and a TID-extension determined from the downloaded directory MPEG table.

Accordingly, an application is made up of a number of modules, which can be downloaded, and if appropriate run, as required. The directory table can be readily identified because it has a particular TID-extension, and once it has been downloaded it enables the receiver/decoder to identify the module tables from their respective TID-extensions.

The method preferably further comprises the steps of: including in the transmitted directory MPEG table a version identification therefor; and at the receiver/decoder: —determining whether the version identification of the currently transmitted directory PMT MPEG table is more recent than the version identification of the currently downloaded directory MPEG table, and if so repeating the steps of downloading the directory MPEG table, determining the TID-extensions, and downloading at least one of the module MPEG tables.

Accordingly, should an application be changed, this can be automatically detected and the updated directory and any updated modules can be downloaded.

At least one of the module MPEG tables may be formatted as a plurality of MPEG sections which are transmitted separately in the MPEG bitstream, each of the MPEG sections containing in a predetermined portion thereof an identification of that MPEG section in the MPEG table and an indication of the number of the sections in a MPEG table.

In accordance with a second aspect of the present invention, there is provided an MPEG receiver/decoder for use in performing part of the method of the first aspect of the invention, comprising: a receiver for receiving the MPEG bitstream; a storage means; and processing means which is programmed to cause that one of the received MPEG tables having the predetermined TID-extension to be downloaded to the storage means, to determine from the content of the directory MPEG table the TID-extensions of the module and MPEG tables, and to cause at least one of the module MPEG tables having the same TID as that of the downloaded directory MPEG table and a TID-extension determined from the downloaded directory MPEG table to be downloaded to the storage means.

Preferably, the processing means is programmed to determine whether a version identification of the currently received directory MPEG table is more recent than a version identification of the downloaded directory MPEG table, and if so to repeat the downloading of the directory MPEG table, determination of the TID-extensions and downloading of at least one of the module MPEG tables.

In the case where the receiver/decoder is arranged to receive at least one of the module tables formatted as a plurality of separately transmitted sections, the processing means is preferably programmed to cause the MPEG sections to be repeatedly downloaded to the storage means until the processing means determines from the section identifications and the section number indication of the downloaded sections that all of the sections have been downloaded.

Preferably, the receiver/decoder further comprises a parallel port and/or a serial port arranged to receive an application formatted as at least one MPEG table, and in this case the short MPEG-2 format is preferably employed, whilst the long MPEG-2 format is preferably used for remote reception, for example by satellite or cable.

This is particularly useful in the case where a manufacturer wishes to test particular features of the receiver/decoder, since an application can be downloaded without it having to be transmitted across the satellite television system.

In accordance with a third aspect of the present invention, there is provided an MPEG transmission system comprising: means for dividing into a plurality of modules an application to be downloaded to an MPEG receiver/decoder; means for formatting each of the modules as a respective MPEG table, the tables having the same TID and respective different TID-extensions other than a predetermined TID-extension; means for generating a directory MPEG table for the models having the same said TID and said predetermined TID-extension, the directory containing for each of the modules a name of that module and the respective TID-extension; and means for cyclically transmitting the directory MPEG table and the module MPEG tables in an MPEG bitstream.

Preferably, the system further comprises means for generating a version identification for the directory MPEG table; and wherein the directory MPEG table generating means is operable to include in the directory MPEG table the generated version identification therefor.

The module formatting means may be operable to format at least one of the module MPEG tables as a plurality of MPEG sections each containing in a predetermined portion thereof an identification of that MPEG section in that MPEG table and an indication of the number of the MPEG sections in that MPEG table.

Desirably, the receiver/decoder should be protected against the downloading of unauthorised applications which could contain, for example, a virus. Accordingly, the concepts of encryption and signing of at least part of the application code may be contemplated.

In accordance with a fourth aspect of the present invention, there is provided a method of downloading data to an MPEG receiver/decoder, comprising the steps of: generating a signature for the data to be downloaded; encrypting the signature using a private key; formatting the data to be downloaded, the encrypted signature and an identification for the private key as an MPEG table; transmitting the MPEG table; and at the receiver/decoder:—receiving the MPEG table; selecting one of a plurality of public keys in accordance with the key identification in the received MPEG table; decrypting the encrypted signature in the received MPEG table using the selected public key to provide a decrypted signature; generating a signature for the data in the received MPEG table; and comparing the decrypted signature and the signature generated at the receiver/decoder for the received data.

Accordingly, the receiver/decoder may be used to download applications having encrypted signatures from more than one source, without the sources needing to know each other's private keys.

The method may further comprise the steps of downloading to the receiver/decoder an application having a signature encrypted using a private key having a predetermined key identification; running the application at the receiver/decoder to cause the receiver/decoder to receive a further key; storing the further key in an area of volatile memory of the receiver/decoder. In this case, during the step of running the application, the further key may be supplied locally to the receiver/decoder, for example via a parallel port, serial port or smart card reader of the receiver/decoder. If the receiver/decoder has a modem connection, the receiver/decoder is preferably arranged to prevent such a further key being supplied via the modem.

These features allow a manufacturer who may wish to test a receiver/decoder to download a key to the receiver/decoder.

The method may further include the steps, at the receiver/decoder, of looking up, in a protected area of memory of the receiver/decoder, a validation flag for the selected public key, and inhibiting or aborting downloading of the data if the looked-up flag is not set.

Accordingly, although a plurality of public keys may be permanently provided in the memory of the receiver/decoder, any of them may be selectively disabled, which may be necessary in the case, for example, where the privacy of a private key associated with a particular public key is breached, or where two operators who have been using the same keys decide that they wish to have separate keys.

In the case where the receiver/decoder is arranged to download an application having a signature encrypted using a private key having a predetermined key identification, as aforesaid, in the protected area of memory of the receiver/decoder the private key having the predetermined key identification may have a validation flag which can be changed by said application, and an ability to receive such a further key is determined in dependence upon the state of that validation flag.

These latter features validation flags for the public keys may be provided independently of the fourth aspect of the invention. Accordingly, a fifth aspect of the present invention provides a method of downloading data to an MPEG receiver/decoder, comprising the steps of:—generating a signature for the data to be downloaded; encrypting the signature using a private key; formatting the data to be downloaded, the encrypted signature and an identification for the private key as an MPEG table; transmitting the MPEG table; and at the receiver/decoder:—receiving the MPEG table; looking up, in a protected area of memory of the receiver/decoder, a validation flag for a public key corresponding to the private key identified in the received MPEG table; and if the looked-up flag is set:—decrypting the encrypted signature in the received MPEG table using the public key corresponding to be private key identified in the received MPEG table to provide a decrypted signature; generating a signature for the data in the received MPEG table; and comparing the decrypted signature and the signature generated at the receiver/decoder for the received data.

The methods of the fourth and fifth aspect of the invention preferably further include the steps of:—generating a validation code for the data to be downloaded, the validation code being encrypted with the signature in the encryption step and being decrypted with the signature in the decryption step; looking up a stored validation code in a protected area of memory of the receiver/decoder; and comparing the looked-up validation code and the decrypted validation code.

Accordingly, the receiver/decoder can be set up to receive only certain applications or types of applications.

These features may be provided independently of the fourth and fifth aspects of the invention. Accordingly, a sixth aspect of the present invention provides a method of downloading data to an MPEG receiver/decoder, comprising the steps of:—generating a validation code for the data to be downloaded; generating a signature for the data to be downloaded, or a part thereof; encrypting the validation code and the signature using a private key; formatting the data to be downloaded and the encrypted validation code and signature as at least one MPEG table; transmitting the or each MPEG table; and at the receiver/decoder:—receiving the or each MPEG table; decrypting the encrypted validation code and signature in the received MPEG tables(s) using a public key corresponding to the private key; looking up a stored validation code in a protected area of memory of the receiver/decoder; comparing the looked-up validation code and the decrypted validation code; generating a signature for the data in the received MPEG table(s) or said part thereof; and comparing the decrypted signature with the signature generated at the receiver/decoder for the received data.

Preferably, the method further includes the step of inhibiting or aborting downloading of the data if, in the validation code comparing step, the looked-up validation code and the decrypted validation code do not match each other.

In the fourth to sixth aspects of the invention, it may be provided that the signature of the data to be downloaded is encrypted in a block of data including other data, with a selected offset between the start of the data block and the start of the signature, and the encrypted data block is decrypted in the decryption step at the receiver/decoder, and further including the steps, at the receiver/decoder, of looking up at least one stored offset in a protected area of memory of the receiver/decoder, and extracting the signature from the decrypted data block using said one looked-up offset from the start of the decrypted data block.

Accordingly, the signature may be disguised amongst other dummy data, making it more difficult to ascertain the location of the signature: Alternatively, or additionally, this feature enables the data to be made available only to one or more particular groups of receiver/decoders.

These features may be provided independently of the fourth to sixth aspect of the invention. Accordingly, a seventh aspect of the present invention provides a method of downloading data to an MPEG receiver/decoder, comprising the steps of:—generating a signature for the data to be downloaded; including the signature and other data in a block of data with a selected offset between the start of the data block and the start of the signature; encrypting the data block using a private key; formatting the data to be downloaded and the encrypted data block as an MPEG table; transmitting the MPEG table; and at the receiver/decoder: —receiving the MPEG table; decrypting the encrypted data block in the received MPEG table using a public key corresponding to the private key; looking up at least one stored offset in a protected area of memory of the receiver/decoder; extracting the signature from the decrypted data block using said one looked-up offset from the start of the decrypted data block; generating a signature for the data in the received MPEG table; and comparing the signature extracted from the decrypted data block with the signature generated at the receiver/decoder for the received data.

In the case where said protected area of memory has at least two such stored offsets, if in the comparing step the extracted signature and the generated signature do not match, the method preferably includes the steps of repeating the looking-up, extracting and comparing steps using another of the stored offsets.

At least some of said other data in the block of data may be dummy or arbitrary data, but, if so, preferably no section of the dummy data repeats the signature.

In the fourth to seventh aspects of the invention, the data may be downloaded as a plurality of modules of the data, and the method may include the steps of:—generating a module signature for each module of data to be downloaded; formatting the modules of data as respective module MPEG tables; generating a directory including an identification of each module MPEG table and the respective signature, the directory being the subject of the signature generating step; and at the receiver/decoder:—generating a respective module signature for each of the modules in the received module MPEG tables; and comparing each module signature in the received directory MPEG table with the respective module signature generated at the receiver/decoder.

Accordingly, although the data to be downloaded is made up of a plurality of modules, only a single encryption process is required in order to encrypt the modules, and only a single decryption process is required in order to allow the signatures to be checked.

These features may be provided independently of the fourth to seventh aspects of the invention. Accordingly, an eighth aspect of the present invention provides a method of downloading a plurality of modules of data to an MPEG receiver/decoder, comprising the steps of:—generating a module signature for each module of data to be downloaded; formatting the modules of data as respective module MPEG tables; generating a directory including an identification of each module MPEG table and the respective signature; generating a directory signature for the directory; encrypting the directory signature using a private key; formatting the directory and the encrypted directory signature as a directory MPEG table; transmitting the directory and module MPEG tables; and at the receiver/decoder:—receiving the directory and module MPEG tables; decrypting the encrypted directory signature in the received directory MPEG table using a public key corresponding to the private key; generating a directory signature for the directory in the received directory MPEG table; comparing the decrypted directory signature and the directory signature generated at the receiver/decoder; generating a respective module signature for each of the modules in the received module MPEG tables; and comparing each module signature in the received directory MPEG table with the respective module signature generated at the receiver/decoder.

The method preferably further includes the step of inhibiting or aborting downloading of such a module of the data if, in the module signature comparing step, the module signature in the received directory MPEG table and the respective module signature generated at the receiver/decoder for that module do not match each other.

The methods described above preferably also include the step of inhibiting or aborting downloading of the data if, in the comparing step(s), the or each decrypted signature and the generated signature do not match each other.

In accordance with a ninth aspect of the present invention, there is provided an MPEG receiver/decoder for use in performing part of the method of the fourth aspect of the invention, comprising: means for receiving such MPEG tables; means for storing a plurality of public keys and an identification for each of the public keys; and processing means which is programmed to select one of the stored public keys in accordance with the key identification in the received MPEG table; to decrypt the encrypted signature in the received MPEG table using the selected public key to provide a decrypted signature; to generate a signature for the data in the received MPEG table; and to compare the decrypted signature and the signature generated at the receiver/decoder for the received data.

The key storing means is preferably provided by ROM, and the identification for each of the public keys may be provided by the storage location of that public key in the key storing means.

The receiver/decoder may further include an area of volatile memory, and the processing means may be operable to download an application having a signature encrypted using a private key having a predetermined key identification, to run the application to cause the receiver/decoder to receive a further key, and to cause the further key to be stored in the area of volatile memory.

The receiver/decoder may further include means to receive such a further key which is supplied locally to the receiver/decoder, such as a parallel port, serial port and/or smart card reader of the receiver/decoder. The volatile memory is preferably provided by RAM. Again, if the receiver/decoder has a modem connection, the receiver/decoder is preferably arranged to prevent such a further key being supplied via the modem.

The receiver/decoder may further include a protected area of memory for storing a validation flag for each of at least some of the public keys, and the processing means may be programmed to look-up, in the protected area of memory, the validation flag for such a selected public key, and to inhibit or abort downloading of the data if the looked-up flag is not set.

The receiver/decoder may also further include a protected area of memory for storing a validation flag for the private key having the predetermined key identification, and the processing means may be operable when running said application to change that validation flag and is operable to enable the further key to be so stored in dependence upon the state of that flag.

This latter feature may be provided independently of the ninth aspect of the invention. Accordingly, a tenth aspect of the present invention provides an MPEG receiver/decoder, comprising: means for receiving such MPEG tables; means for storing a public key and an identification for the public key; and a protected area of memory for storing a validation flag for the public key; and processing means which is programmed to look-up, in the protected area of memory of the receiver/decoder, a validation flag for the public key corresponding to the private key identified in the received MPEG table; and, if the looked-up flag is set, to decrypt the encrypted signature in the received MPEG table using the public key corresponding to be private key identified in the received MPEG table to provide a decrypted signature, to generate a signature for the data in the received MPEG table; and to compare the decrypted signature and the signature generated by the receiver/decoder for the received data.

The memory for storing the key validation flag(s) is preferably provided by rewritable non-volatile memory.

In the case where a plurality of such public keys are stored, the memory for storing the validation flag(s) is preferably arranged as a bitmap.

The receiver/decoder of the ninth or tenth aspects of the invention may further include a protected area of memory for storing a validation code, and the processing means may be programmed to decrypt the validation code in such a received MPEG table, to look-up the stored validation code, and to compare the looked-up validation code and the decrypted validation code.

This latter feature may be provided independently of the ninth or tenth aspects of the invention. Accordingly, an eleventh aspect of the present invention provides an MPEG receiver/decoder, comprising: means for receiving such MPEG tables; means for storing a public key and an identification for the public key; a protected area of memory for storing a validation code; and processing means which is programmed to decrypt the encrypted validation code and signature in such a received MPEG tables using the stored public key corresponding to the private key; to look-up the stored validation code in the protected area of memory; to compare the looked-up validation code and the decrypted validation code; to generate a signature for the data in the received MPEG table or said part thereof; and to compare the decrypted signature with the signature generated by the receiver/decoder for the received data.

The processing means is preferably programmed to inhibit or abort downloading of the data if the looked-up validation code and the decrypted validation code do not match each other.

The memory for storing the validation codes is preferably provided by rewritable non-volatile memory, and may be arranged as a bitmap.

The receiver/decoder of the ninth to eleventh aspects of the invention may further include a protected area of memory for storing at least one offset, and the processing means may be programmed to decrypt the encrypted data block in such a received MPEG table, to look-up said one stored offset in the protected area of memory, and to extract the signature from the decrypted data block using the looked-up offset from the start of the decrypted data block.

This latter feature may be provided independently of the ninth to eleventh aspects of the invention. Accordingly, a twelfth aspect of the invention provides an MPEG receiver/decoder, comprising: means for receiving such MPEG tables; means for storing a public key and an identification for the public key; a protected area of memory for storing at least one offset; and processing means which is programmed to decrypt the encrypted data block in such a received MPEG table using the stored public key corresponding to the private key; to look-up said one stored offset in the protected area of memory; to extract the signature from the decrypted data block using the looked-up offset from the start of the decrypted data block; to generate a signature for the data in the received MPEG table; and to compare the signature extracted from the decrypted data block with the signature generated at the receiver/decoder for the received data.

The memory for storing the offset is preferably provided by rewritable non-volatile memory.

In the receiver/decoder of the ninth to twelfth aspects of the invention, the processing means may be programmed to generate a respective module signature for each of the modules in the received module MPEG tables, and to compare each module signature in the received directory MPEG table with the respective module signature generated by the receiver/decoder.

This latter feature may be provided independently of the ninth to twelfth aspects of the invention. Accordingly, a thirteenth aspect of the invention provides an MPEG receiver/decoder, comprising: means for receiving such directory and module MPEG tables; means for storing a public key and an identification for the public key; and processing means which is programmed to decryp the encrypted directory signature in the received directory MPEG table using the stored public key corresponding to the private key; to generate a directory signature for the directory in the received directory MPEG table; to compare the decrypted directory signature and the directory signature generated by the receiver/decoder; to generate a respective module signature for each of the modules in the received module MPEG tables; and to compare each module signature in the received directory MPEG table with the respective module signature generated by the receiver/decoder.

The processing means is preferably programmed to inhibit or abort downloading of such a module of the data if the module signature in the received directory MPEG table and the respective module signature generated at the receiver/decoder for that module do not match each other.

In the receiver/decoder of any of the ninth to thirteenth aspects of the invention, the processing means is preferably programmed to inhibit or abort downloading of the data if the or each decrypted signature and the generated signature do not match each other.

Preferred features of the present invention will now be described, purely by way of example, with reference to the accompanying drawings, in which:—

FIG. 3 is a schematic diagram of interfaces of a receiver/decoder forming part of the system of FIGS. 1 and 2;

FIG. 4 is a schematic diagram of a remote controller used in the digital television system;

FIG. 5 shows the arrangement of files within a module downloaded into the memory of an interactive receiver/decoder;

Figure 1:
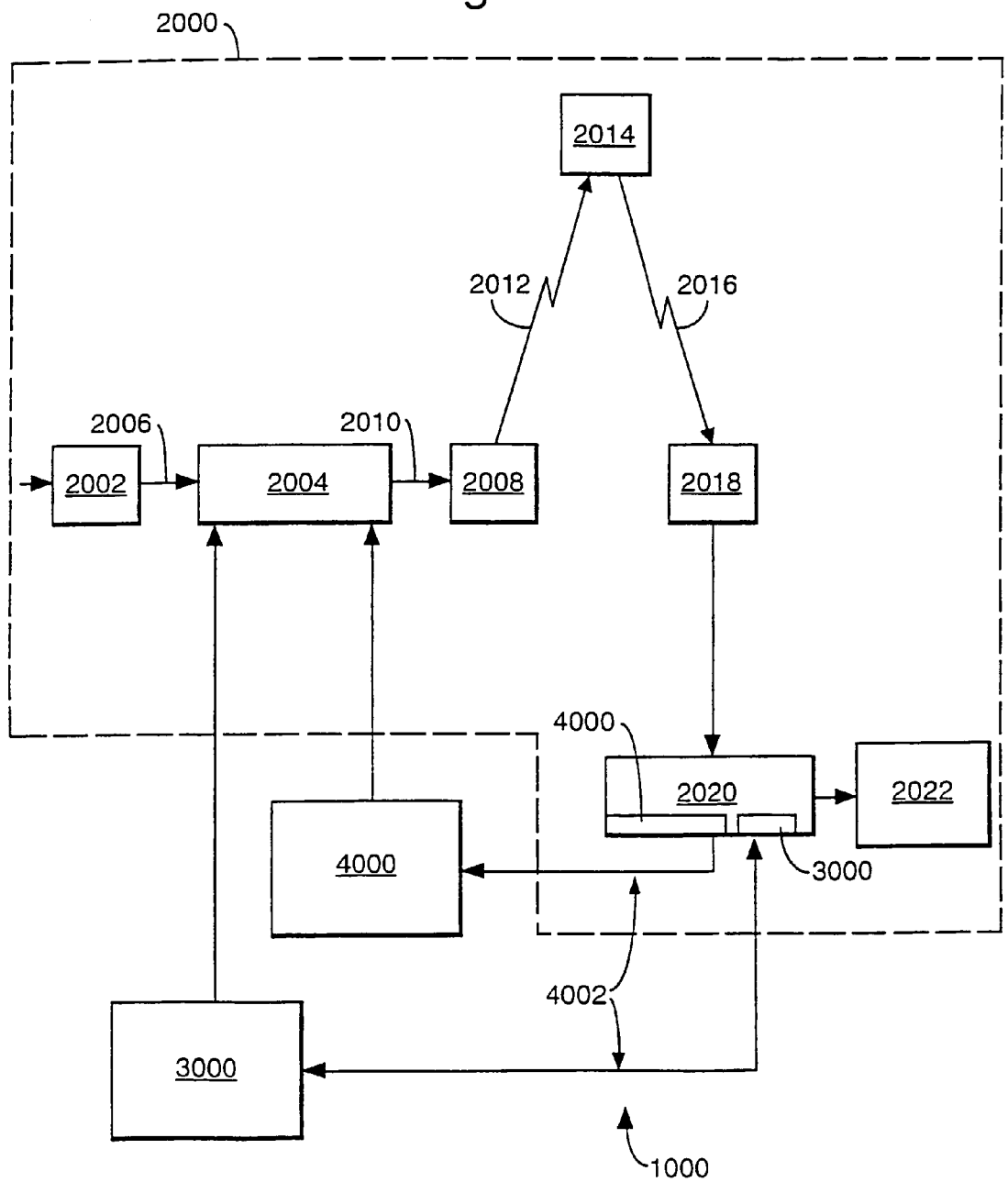
FIG. 1 shows the overall architecture of a digital television system.

An overview of a digital television system 1000 according to the present invention is shown in FIG. 1. The invention includes a mostly conventional digital television system 2000 which uses the known MPEG-2 compression system to transmit compressed digital signals. In more detail, MPEG-2 compressor 2002 in a broadcast centre receives a digital signal stream (typically a stream of video signals). The compressor 2002 is connected to a multiplexer and scrambler 2004 by linkage 2006. The multiplexer 2004 receives a plurality of further input signals, assembles one or more transport streams and transmits compressed digital signals to a transmitter 2008 of the broadcast centre via linkage 2010, which can of course take a wide variety of forms including telecommunications links. The transmitter 2008 transmits electromagnetic signals via uplink 2012 towards a satellite transponder 2014, where they are electronically processed and broadcast via notional downlink 2016 to earth receiver 2018, conventionally in the form of a dish owned or rented by the end user. The signals received by receiver 2018 are transmitted to an integrated receiver/decoder 2020 owned or rented by the end user and connected to the end user's television set 2022. The receiver/decoder 2020 decodes the compressed MPEG-2 signal into a television signal for the television set 2022.

A conditional access system 3000 is connected to the multiplexer 2004 and the receiver/decoder 2020, and is located partly in the broadcast centre and partly in the decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 2020. Using the decoder 2020 and smartcard, the end user may purchase commercial offers in either a subscription mode or a pay-per-view mode.

An interactive system 4000, also connected to the multiplexer 2004 and the receiver/decoder 2020 and again located partly in the broadcast centre and partly in the decoder, enables the end user to interact with various applications via a modemmed back channel 4002.

Figure 2:
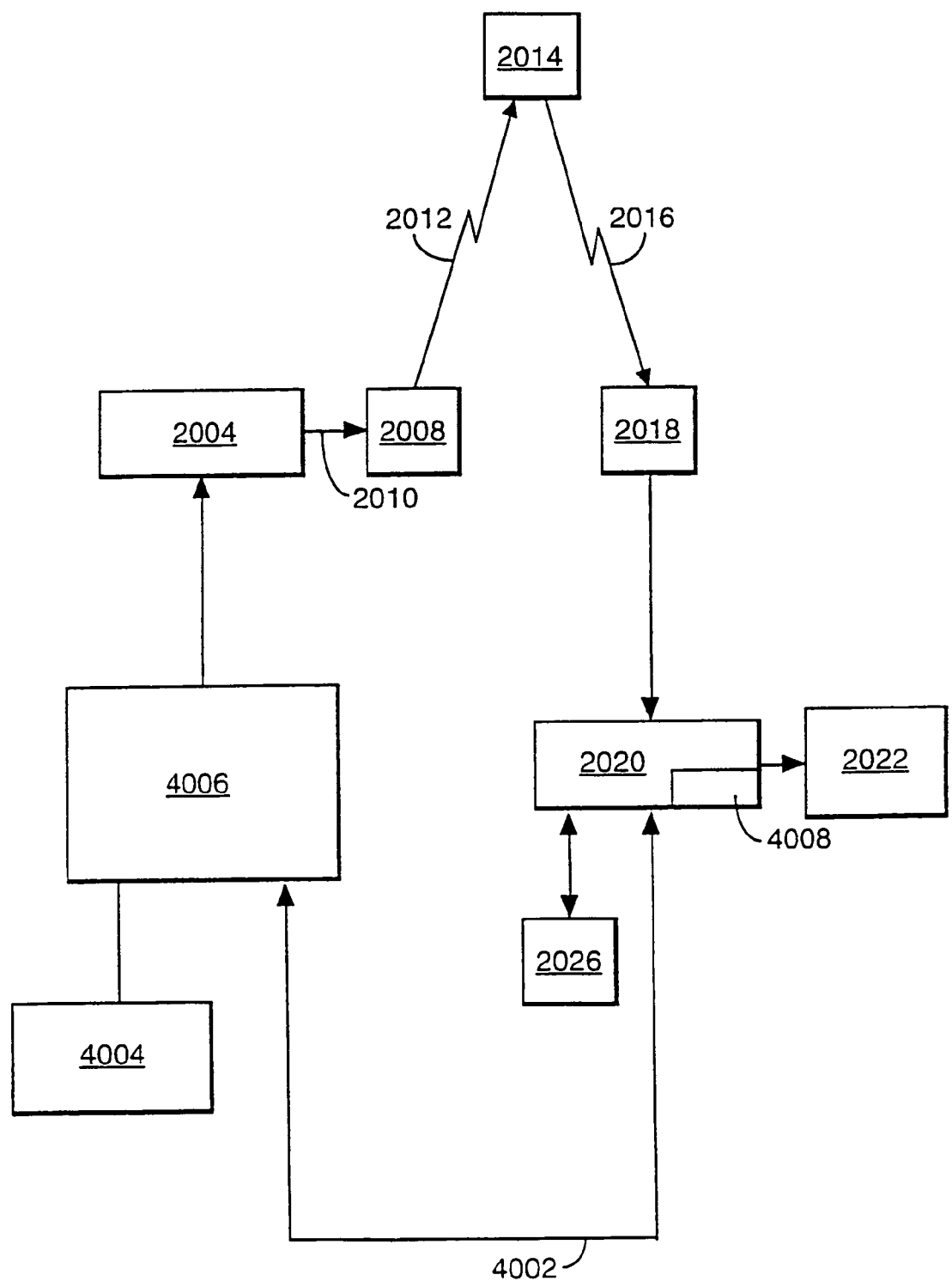
FIG. 2 shows the architecture of an interactive system of the digital television system of FIG. 1.

FIG. 2 shows the general architecture of the interactive television system 4000 of the digital television system 1000 of the present invention.

For example, the interacting system 4000 allows an end user to buy items from on-screen catalogues, consult local news and weather maps on demand and play games through their television set.

The interactive system 4000 comprises in overview four main elements:— an authoring tool 4004 at the broadcast centre or elsewhere for enabling a broadcast supplier to create, develop, debug and test applications;

an application and data server 4006, at the broadcast centre, connected to the authoring tool 4004 for enabling a broadcast supplier to prepare, authenticate and format applications and data for delivery to the multiplexer and scrambler 2004 for insertion into the MPEG-2 transport stream (typically the private section thereof) to be broadcast to the end user;

a virtual machine intending a run time engine (RTE) 4008, which is an executable code installed in the receiver/decoder 2020 owned or rented by the end user for enabling an end user to receive, authenticate, decompress, and load applications into the working memory of the decoder 2020 for execution. The engine 4008 also runs resident, general-purpose applications. The engine 4008 is independent of the hardware and operating system; and a modemmed back channel 4002 between the receiver/decoder 2020 and the application and data server 4006 to enable signals instructing the server 4006 to insert data and applications into the MPEG-2 transport stream at the request of the end user.

The interactive television system operates using "applications" which control the functions of the receiver/decoder and various devices contained therein. Applications are represented in the engine 4008 as "resource files". A "module" is a set of resource files and data. A "memory volume" of the receiver/decoder is a storage space for modules. Modules may be downloaded into the receiver/decoder 2020 from the MPEG-2 transport stream.

Physical interfaces of the receiver/decoder 2020 are used for downloading data. With reference to FIG. 3, the decoder 2020 contains, for example, six downloading devices; MPEG flow tuner 4028, serial interface 4030, parallel interface 4032, modem 4034 and two card readers 4036.

For the purposes of this specification, an application is a piece of computer code for controlling high level functions of preferably the receiver/decoder 2020. For example, when the end user positions the focus of a remote controller 2026 (as shown in more detail in FIG. 4) on a button object seen on the screen of the television set 2022 and presses the validation key, the instruction sequence associated with the button is run.

An interactive application proposes menus and executes commands at the request of the end user and provides data related to the purpose of the application. Applications may be either resident applications, that is, stored in the ROM (or FLASH or other non-volatile memory) of the receiver/decoder 2020, or broadcast and downloaded into the RAM (or FLASH) of the decoder 2020.

Examples of applications are:—

An Initiating Application. The receiver/decoder 2020 is equipped with a resident initiating application which is an adaptable collection of modules (this term being defined in more detail hereunder) enabling the receiver/decoder 2020 to be immediately operative in the MPEG-2 environment. The application provides core features which can be modified by the broadcast supplier if required. It also provides an interface between resident applications and downloaded applications.

A Startup Application. The startup application allows any application, either downloaded or resident, to run on the receiver/decoder 2020. This application acts as a bootstrap executed on arrival of a service in order to start the application. Startup is downloaded into RAM and therefore can be updated easily. It can be configured so that the interactive applications available on each channel can be selected and run, either immediately after downloading or after preloading. In the case of preloading, the application is loaded into the memory 2024 and is activated by the startup when required.

A Program. Guide. The Program Guide is an interactive application which gives full information about programming. For example, it may give information about, say, one week's television programmes provided on each channel of a digital television bouquet. By depressing a key on the remote controller 2026, the end user accesses an add-on screen, overlaid on the event shown on the screen of the television set 2022. This add-on screen is a browser giving information on the current and next events of each channel of the digital TV bouquet. By depressing another key on the remote controller 2026, the end user accesses an application which displays a list of information on events over one week. The end user can also search and sort events with simple and customised criteria. The end user can also access directly a selected channel.

A Pay Per View application. The Pay Per View Application is an interactive service available on each PPV channel of the digital TV bouquet in conjunction with the conditional access system 3000. The end user can access the application using a TV guide or channel browser. Additionally, the application starts automatically as soon as a PPV event is detected on the PPV channel. The end user is then able to buy the current event either through his daughter smartcard 3020 or via the communication server 3022 (using a modem, a telephone and DTMF codes, MINITEL or the like). The application may be either resident in the ROM of the receiver/decoder 2020 or downloadable into the RAM of the receiver/decoder 2020.

A PC Download application. On request, an end user can download computer software using the PC download application.

A Magazine Browser application. The magazine browser application comprises a cyclic video broadcast of images with end user navigation via on-screen buttons.

A Quiz application. The quiz application is preferably synchronised with a broadcast quiz programme. As an example, multiple choice questions are displayed on the screen of the television 2022, and the user can select an answer using the remote controller 2026. The quiz application can inform the user whether the answer is correct or not, and can keep count of the user's score.

A Teleshopping application. In one example of the teleshopping application, offers of goods for sale are transmitted to the receiver/decoder 2020 and displayed on the television 2022. Using the remote controller, the user can select a particular item to buy. The order for the item is sent via the modemmed back channel 4002 to the application and data server 4006 or to a separate sales system the telephone number of which has been downloaded to the receiver/decoder, possibly with an order to debit the account for a credit card which has been inserted into one of the card readers 4036 of the receiver/decoder 2020.

A Telebanking application. In one example of the telebanking application, the user inserts a bank card into one of the card readers 4036 of the receiver/decoder 2020. The receiver/decoder 2020 dials up the user's bank, using a telephone number stored in the bank card or stored in the receiver/decoder, and then the application provides a number of facilities which can be selected using the remote controller 2026, for example for downloading via the telephone line a statement of account, transferring funds between accounts, requesting a cheque book, etc.

An Internet Browser application. In one example of the Internet browser application, instructions from the user, such as a request to view a web page having a particular URL, are entered using the remote controller 2026, and these are sent by the modemmed back channel 4002 to the application and data server 4006. The appropriate web page is then included in the transmissions from the broadcast centre, received by the receiver/decoder 2020 via the uplink 2012, transponder 2014 and downlink 2016, and displayed on the television 2022.

Applications are stored in memory locations in the receiver/decoder 2020 and represented as resource files. The resource files comprise graphic object description unit files, variables block unit files, instruction sequence files, application files and data files.

The graphic object description unit files describe the screens, the man-machine interface of the application. The variables block unit files describe the data structures handled by the application. The instruction sequence files describe the processing operations of the applications. The application files provide the entry points for the applications.

The applications constituted in this way can use data files, such as icon library files, image files, character font files, colour table files and ASCII text files. An interactive application can also obtain on-line data by effecting inputs and/or outputs.

The engine 4008 only loads into its memory those resource files it needs at a given time. These resource files are read from the graphic object description unit files, instruction sequence files and application files; variables block unit files are stored in memory following a call to a procedure for loading modules and remain locked there until a specific call to a procedure for unloading modules is made.

With reference to FIG. 3, a module 4010, such as a tele-shopping module, is a set of resource files and data comprising the following:
 a single application file 4012;
 an undetermined number of graphic object description unit files 4014;
 an undetermined number of variables block unit files 4016;
 an undetermined number of instruction sequence files 4018; and
 where appropriate, data files 4020 such as icon library files, image files, character font files, colour table files and ASCII text files.

With reference to FIG. 5, a module 4010, such as a teleshopping module, is a set of resource files and data comprising the following:
 a single application file 4012;
 an undetermined number of graphic object description unit files 4014;
 an undetermined number of variables block unit files 4016;
 an undetermined number of instruction sequence files 4018; and
 where appropriate, data files 4020 such as icon library files, image files, character font files, colour table files and ASCII text files.

The concept of modules 4010 together with the concept of downloading small pieces of code allows the easy evolution of applications. They can be downloaded into permanent FLASH memory of the decoder 2020 as resident software or broadcast in order to be downloaded into the RAM of the decoder 2020 only when needed by the end user.

To download a module 4010 from a carrier signal, a directory accessible on the carrier signal is first downloaded. This directory simply lists the names of the modules 4010 which can be downloaded from the carrier signal. Once this directory has been downloaded, it is possible for the application to download one or more modules 4010. In the case of MPEG flow, the directory is transported in one single MPEG table. Furthermore, one module 4010 is transported in one single MPEG table. In the case of modules transmitted to the MPEG tuner 4028, the long MPEG-2 format is used, with a long header and a CRC code. This is also the case with the five other interfaces (serial interface 4030, parallel interface 4032, modem 4034 and two card readers 4036), except that the "short" MPEG-2 format with a shorter header and no CRC is used.

Figure 6:
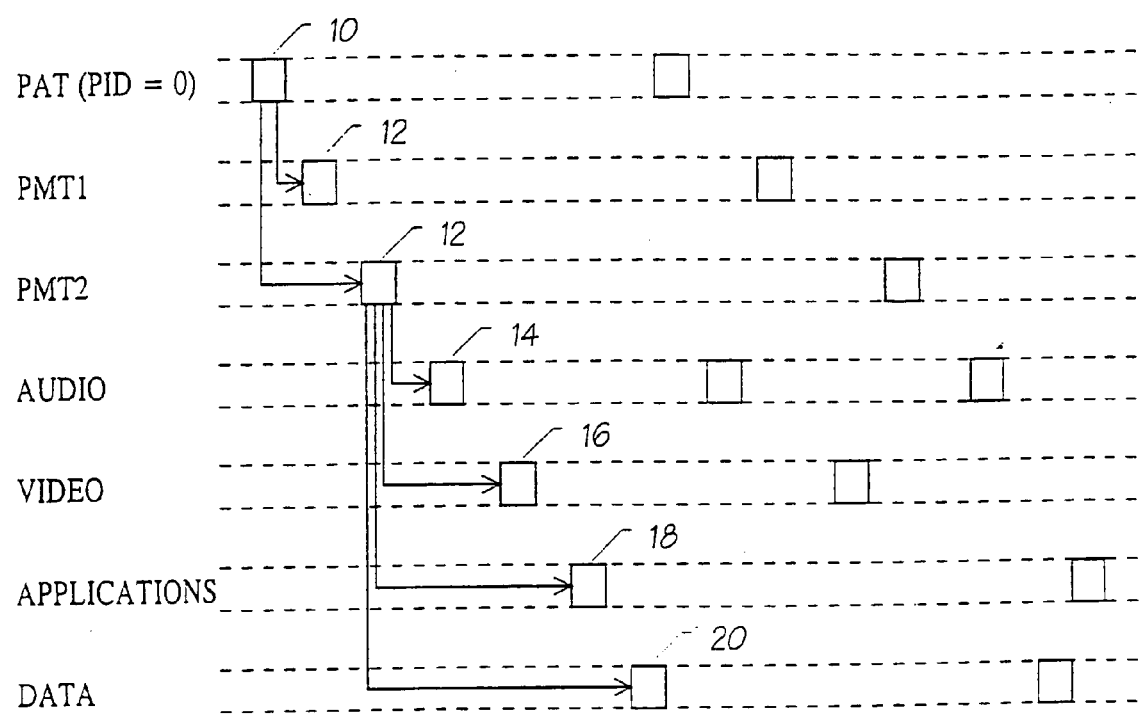
FIG. 6 illustrates an interrelationship between a number of components of as MPEG stream.

Referring in particular to FIG. 6, as is known, the MPEG-2 bitstream includes a programme access table ("PAT") 10 having a packet identification ("PID") of 0. The PAT contains references to the PIDs of the programme map tables ("PMTs") 12 of a number of programmes. Each PMT contains a reference to the PIDs of the streams of the audio MPEG tables 14 and video MPEG tables 16 for that programme. A packet having a PID of zero, that is the programme access table 10, provides the entry point for all MPEG access.

In order to download applications and data for them, two new stream types are defined, and the relevant PMT also contains references to the PIDs of the streams of application MPEG tables 18 (or sections of them) and data MPEG tables 20 (or sections of them).

Figure 7:
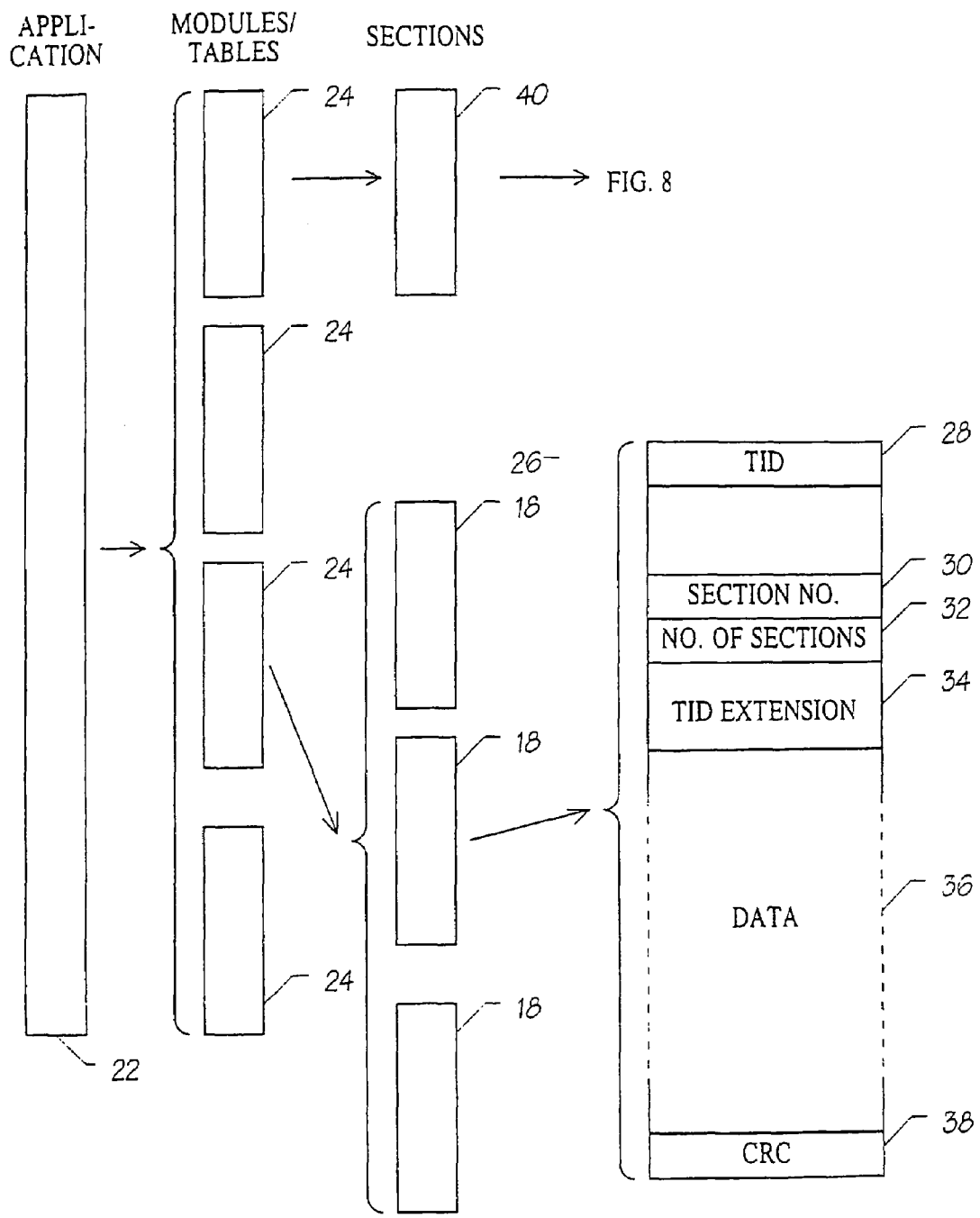
FIG. 7 illustrates how an application may be made up of modules/tables, which in turn may be made up of sections.

Referring to FIG. 7, in order to download an application 22, the application is divided into modules 24 each formed by an MPEG table, some of which are made up by a single section 18, and others of which may be made up by a plurality of sections 18. A typical section 18 has a header 26, which includes a one-byte table identification ("TID") 28, the section number 30 of that section in the table, the total number 32 of sections in that table and a two-byte TID extension 34. Each section also includes a data part 36 and a CRC 38. For a particular module/table 24, all of the sections 18 making up that table 24 have the same TID 28 and the same TID extension 34. For a particular application 22, all of the tables 24 making up that application 22 have the same TID 28, but different respective TID extensions.

Figure 8:
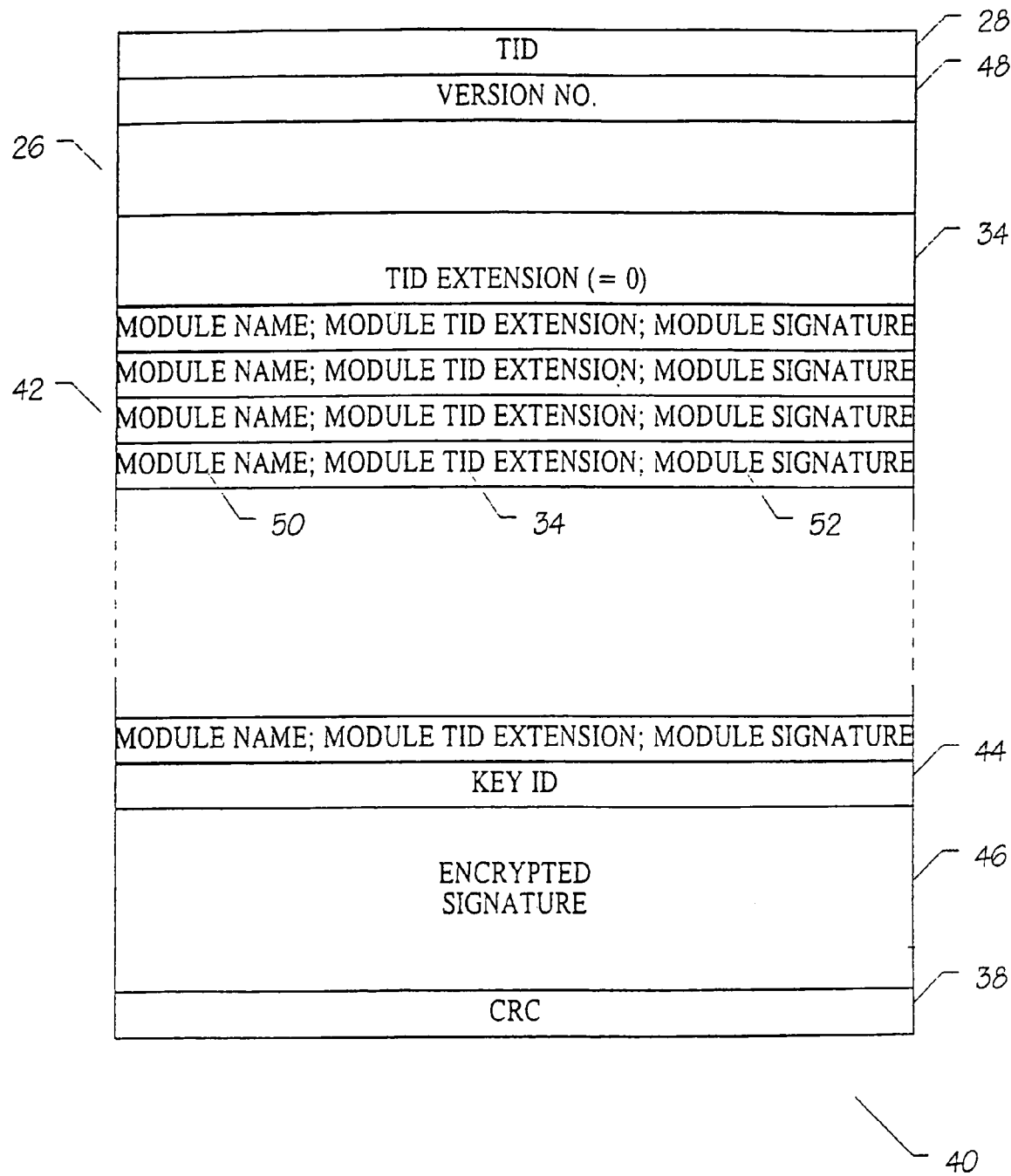
FIG. 8 illustrates the content of a directory module.

For each application 22, there is a single such MPEG table 24 which is used as a directory, and which is shown in greater detail in FIG. 8. The directory table 40 includes a header 26, a directory part 42, a key identification 44, an encrypted signature 46 and a CRC 38. From the above, it will be appreciated that the directory table 40 has, in its header 26, the same TID 28 as the other modules/tables 24 making up the application. However, the directory table has a predetermined TID extension 34 of zero, and all of the other modules 24 have non-zero TID extensions. The header also includes a version number 48 for the directory table 40. The directory part 42 includes, for each of the other modules/tables 24 making up the application 22, the name 50 of that module, the TID extension 34 for that module, and a signature 52 of that module. The directory part 42 may also include, for each of the other modules/tables 24, the length of that module and the version number of the module.

Referring back to FIG. 6, in operation, the PAT 10, PMTs 12 and application and data stream components 18, 20 are cyclically transmitted, being updated as necessary. Each application which is transmitted has a respective predetermined TID 28. To download an application, the MPEG table having the appropriate TID and a TID extension of zero is downloaded to the receiver/decoder 2020. This, therefore, is the directory table 40 for the required application. The data in the directory is then processed by the receiver/decoder 2020 to determine the TID extensions 34 of the module tables making up the required application, and then any required module table having the same TID as the directory table and a TID extension determined from the directory can be downloaded.

The receiver/decoder 2020 is arranged to check the directory table for any updating of it. This may be done by downloading the directory table again periodically, for example every 30 seconds, or one or five minutes, and comparing the version number of the freshly downloaded directory table with the version number of the previously downloaded directory table. If the freshly downloaded version number is later, then the modules associated with the previous directory table, or any such models for which there are later version numbers, are unmounted, and the later modules are downloaded and mounted. In an alternative arrangement, the incoming bitstream is filtered using a mask corresponding to the TID, TID extension and version number, with values set for the TID of the application, a TID extension of zero and a version number one greater than the version number of the currently downloaded directory. Accordingly, an increment of the version number can be detected, and once detected the directory is downloaded and the application is updated, as described above. Further description of such filtering is contained in copending application. If an application is to be terminated, an empty directory with the next version number is transmitted, but without any modules listed in the directory. In response to receipt of such an empty directory, the receiver/decoder 2020 is programmed to unmount the application.

The use of signatures and encryption for the application tables will now be described in detail.

As described above, the entry for each module in the directory table 40 includes the module signature. The module signature is generated using a known MD5 signature generating process on the data in the respective module table.

Figure 9:
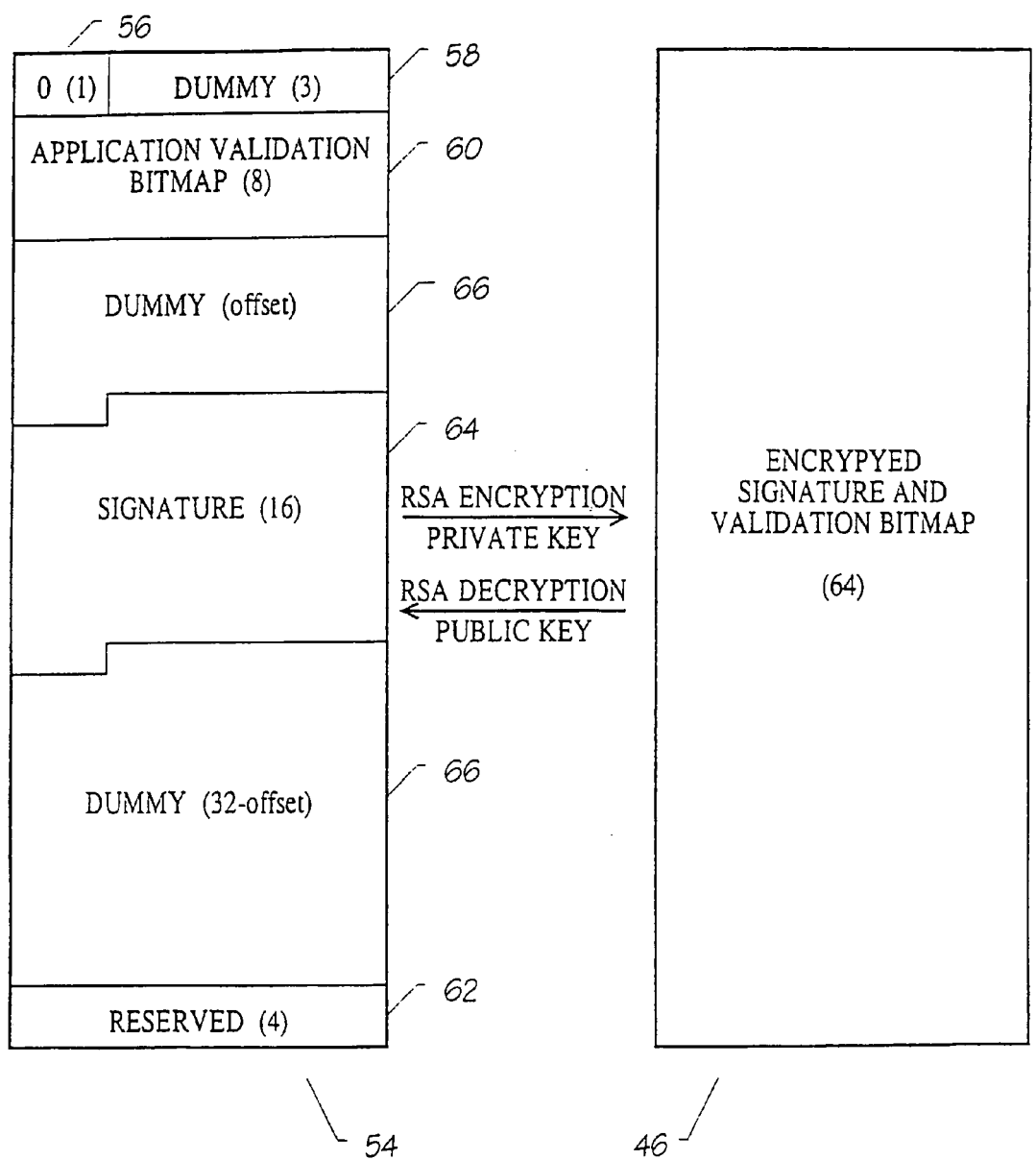
FIG. 9 illustrates in more detail part of the content of the directory module.

Furthermore, the directory table 40 includes an encrypted signature 46, which is generated in the manner which will now be described with reference to FIG. 9. A block 54 of 64 bytes of data is produced. The first byte 56 is zero. The next three bytes 58 can include dummy or arbitrary data. The next eight bytes 60 provide an application validation bitmap, which will be further described. The last four bytes 62 are reserved. The remaining 32 bytes contain a 16 byte signature 64 which begins at an offset of between 0 and 31 bytes after the first byte following the application validation bitmap 60. Dummy data 66 is inserted between the application validation bitmap 60 and the signature 64 and/or between the signature 64 and the reserved bytes 62. The signature 64 is produced using the known MD5 signature generating process on the directory entries 42 in the directory table 40. The block 54 is then encrypted using a known encryption process and a particular private key to produce the encrypted signature and application validation bitmap 46. This data block 46 is included in the directory table 40, and a 1-byte identification of the private key which was used to encrypt the block is included in the directory table 40 as the key identification 44.

To summarise the generation of an application and its transmission, the following steps are involved:—
- generate the application as a plurality of modules;
- note the predetermined TID 28 for the application;
- allocate names and non-zero TID extensions 34 for the modules;
- format each module as an MPEG table 24 or sections 18 of an MPEG table;
- generate an MD5 signature 52 of each module;
- generate the directory 42;
- generate an MD5 signature 64 for the directory;
- select an application validation bit 60;
- select an offset;
- generate the block 54;
- encrypt the block 54 using encryption with a selected private key;
- generate the directory MPEG table 40 with the allocated TID 28, a TID extension of zero, the directory 42, an identification 44 of the private key, and the encrypted signature 46;
- transmit the directory table 40 and module tables 24 or sections 18.

Figure 10:
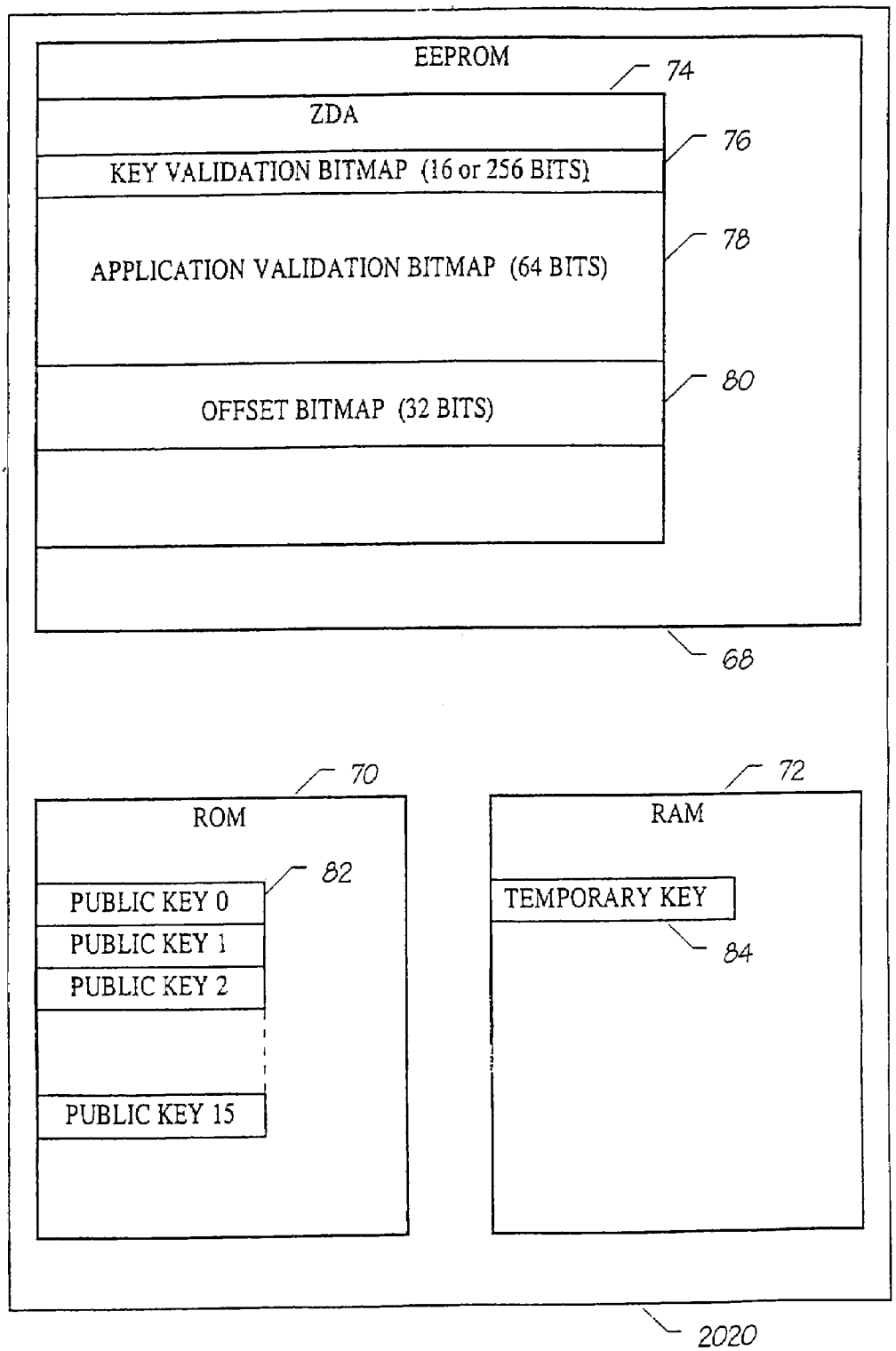
FIG. 10 illustrates various areas of memory in a receiver/decoder of the television system.

The operation of the receiver/decoder 2020 in dealing with signatures and decryption during downloading of an application will now be described. Referring to FIG. 10, the receiver/decoder 2020 includes EEPROM 68, ROM 70 and RAM 72. The EEPROM 68 includes a protected region 74 which is used by the virtual machine, and where only the virtual machine (and not a normal application) can write. The protected region 74 includes a key validation bitmap 76 of 16 or 256 bits, an application validation bitmap 78 of 64 bits, and an offset bitmap 80 of 32 bits. The ROM 70 includes, in one embodiment, sixteen public keys 82, in which case a 16-bit key validation bitmap is employed, and in another embodiment 256 public keys, in which case a 256-bit key validation bitmap is employed. The public keys are identified by their physical locations in the ROM 70, or they may alternatively be included in a lookup table, whereby a particular key identification will yield the corresponding public key. The RAM 72 may be used to store a temporary key 84.

As mentioned above, when an application is to be downloaded, firstly the directory table having the predetermined TID for that application and a TID extension of zero is downloaded. The key identification 44 is then extracted from the directory table and a check is made of the key validation bitmap 76 in the protected memory 74 that the bit corresponding to the extracted key identification 44 is set. If it is not, then further downloading of the application is aborted. However, if the appropriate key is set, then a public key 82 is selected from the ROM 70 corresponding to the extracted key identification 44. The selected public key and a known decryption process are then used to decrypt the encrypted block 46 in the directory table 40 to produce a block 54. The application validation bitmap 60 is then extracted from the decrypted block 54 and is ANDed with the application validation bitmap 78 stored in the protected memory 74.

If the result of the AND operation is zero, then further downloading of the application is aborted. However, if the result of the AND operation is non-zero, the offset contained in the offset bitmap 80 in the protected memory 74 is looked up, or, if more than one offset bit is set, each offset bit is looked up in turn, and sixteen bytes of data are extracted from the decrypted block 54 starting with the looked-up offset from the first byte after the application validation bitmap 60. For the or each looked-up offset, the 16 bytes are treated as the signature transmitted with the directory table 40. The signature of the entries in the directory 42 of the directory table 40 is calculated using the known MD5 process, and this calculated signature is compared with the signature extracted from the block 54. If the two signatures for the or each looked-up offset do not match, then further downloading of the application is aborted. However, if one of the signatures matches, then downloading of the modules specified in the directory 42 can proceed. As mentioned above, in order to download a particular module, the TID extension for that module is obtained from the directory 42, and the MPEG table 24 or sections 18 with the same TID as the directory table and with the obtained TID extension is downloaded. Once the module MPEG table has been downloaded, the receiver/decoder 2020 calculates the signature of the downloaded table using the known MD5 process and then compares that calculated signature with the signature contained in the directory entry. If the signatures match, then the module is accepted, but if they do not match, then the module is rejected.

All of the modules of the application can thus be downloaded in the manner specified above, and the application an be run by the receiver/decoder 2020.

Having described features of the downloading operation which are normally used, a description will now be made of some features used in setting up the receiver/decoder 2020 and changing its settings.

The receiver/decoder 2020 is programmed so that the protected memory area 74 can be changed, but only by an application which has been downloaded using a particular one of the key identifications, for example key 15, and with a particular offset, for example an offset of zero bytes from the first byte after the application validation bitmap 60. The protected memory 74 might need to be changed, for example, if two operators who have been using the same public key decide that they wish to use different public keys, or if the content of a private key were discovered, in which case the corresponding public key may be marked as invalid in the key validation bitmap 76.

The receiver/decoder 2020 may be arranged such that one of the keys, for example key 15, is always available, in which case that key does not require a bit in the key validation bitmap 76. Accordingly, that bit may be used for another purpose. In particular, an application which has been authenticated using key 15 may be arranged to set that particular bit to 1, in which case the receiver/decoder 2020 is programmed to permit a temporary key 84 to be loaded into the RAM 72, but only if via the serial interface 4030, parallel interface 4032 or one of the two card readers 4036. This facility may be used by, for example, a manufacturer of the receiver/decoder 2020, who may be given an application to use to enable a temporary key to be loaded into the receiver/decoder 2020 so that it may be tested.

The encryption and signing arrangement described above provides a number of important features. In particular:—
- an application can only be downloaded if the receiver/decoder 2020 has the appropriate public key stored in its memory corresponding to the key identification 44 in the downloaded directory table;
- for all except one of the keys, an application can only be downloaded using a particular key if the key validation bitmap 76 in the memory of the receiver/decoder 2020 is set to enable that key to be used;
- an application can only be downloaded if a set bit in the offset bitmap 80 stored in the memory of the receiver/ decoder 2020 corresponds with the offset used in generating the directory table;

an application can only be downloaded if the application validation bitmap 78 in the memory of the receiver/decoder 2020 is appropriately set to enable the application to be downloaded;

an application can only be downloaded if the directory table has not been corrupted after its signature was originally generated;

each module of an application can only be downloaded if the respective module table has not been corrupted after its signature was originally-generated;

only one encryption operation is required in preparing an application for downloading despite the application being made up of several MPEG tables, and only one decryption operation is required at the receiver/decoder 2020 to download the complete application;

multiple keys may be employed, so that different service providers can have different private keys;

a temporary key may be used, for example by a manufacturer, for testing purposes.

It will be understood that the present invention has been described above purely by way of example, and modifications of detail can be made within the scope of the invention.

Each feature disclosed in the description, and (where appropriate) the claims and drawings may be provided independently or in any appropriate combination.

In the aforementioned preferred embodiments, certain features of the present invention have been implemented using computer software. However, it will of course be clear to the skilled man that any of these features may be implemented using hardware. Furthermore, it will be readily understood that the functions performed by the hardware, the computer software, and such like are performed on or using electrical and like signals.

Cross reference is made to our co-pending applications, all bearing the same filing date, and entitled Signal Generation and Broadcasting, Smartcard for use with a Receiver of Encrypted Broadcast Signals, and Receiver, Broadcast and Reception System and Conditional Access System therefor, Downloading a Computer File from a Transmitter via a Receiver/Decoder to a Computer, Transmission and Reception of Television Programmes and Other Data, Downloading Data, Computer Memory Organisation, Television or Radio Control System Development, Extracting Data Sections from a Transmitted Data Stream, Access Control System, Data Processing System, and Broadcast and Reception System, and Receiver/Decoder and Remote Controller therefor. The disclosures of these documents are incorporated herein by reference. The list of applications includes the present application.

What is claimed is:

1. A method of downloading data to an MPEG receiver/decoder, comprising the steps of:
    generating a signature for the data to be downloaded;
    including the signature and other data in a block of data, the signature being dissimulated in the data block by using a selected offset between the start of the data block and the start of the signature;
    encrypting the data block using a private key;
    formatting the data to be downloaded and the encrypted data block as an MPEG table;
    transmitting the MPEG table; and
    at the receiver/decoder:
        receiving the MPEG table;
        decrypting the encrypted data block in the received MPEG table using a public key corresponding to the private key;
        looking up at least one stored offset in a protected area of memory of the receiver/decoder;
        extracting the signature from the decrypted data block using said one looked-up offset from the start of the decrypted data block;
        generating a signature for the data in the received MPEG table; and
        comparing the signature extracted from the decrypted data block with the signature generated at the receiver/decoder for the received data.

2. A method as claimed in claim 1, wherein said protected area of memory has at least two such stored offsets, and, if in the comparing step the extracted signature and the generated signature do not match, further including the steps of repeating the look-up, extracting and comparing steps using another of the stored offsets.

3. A method as claimed in claim 1, wherein at least some of said other data in the block of data is dummy or arbitrary data.

4. A method as claimed in claim 1, wherein the data is downloaded as a plurality of modules of the data, and including the steps of:
    generating a module signature for each module of data to be downloaded;
    formatting the modules of data as respective module MPEG tables;
    generating a directory including an identification of each module MPEG table and the respective signature, the directory being the subject of the signature generating step; and
    at the receiver/decoder:
        generating a respective module signature for each of the modules in the received module MPEG tables; and
        comparing each module signature in the received directory MPEG table with the respective module signature generated at the receiver/decoder.

5. A method as claimed in claim 4, further including the step of inhibiting or aborting downloading of such a module of the data if, in the module signature comparing step, the module signature in the received directory MPEG table and the respective module signature generated at the receiver/decoder for that module do not match each other.

6. A method as claimed in claim 1, further including the step of inhibiting or aborting downloading of the data if, in the comparing step(s), the or each decrypted signature and the generated signature do not match each other.

7. An MPEG receiver/decoder, comprising:
    means for receiving MPEG tables, wherein each MPEG table includes a signature and other data in a block of data, the signature being dissimulated in the data block by using a selected offset between the start of the data block and the start of the signature, wherein the block of data is encrypted using a private key;
    means for storing a public key and an identification for the public key;
    a protected area of memory for storing at least one offset; and
    processing means programmed to decrypt the encrypted data block in such a received MPEG table using the stored public key corresponding to the private key; to look-up said one stored offset in the protected area of memory; to extract the signature from the decrypted data block using the looked-up offset from the start of the decrypted data block; to generate a signature for the data in the received MPEG table; and to compare the signature extracted from the decrypted data block with the signature generated at the receiver/decoder for the received data.

8. A receiver/decoder as claimed in claim 7, wherein at least two such offsets are stored in the protected area of the memory, and the processing means is operable, if the if the extracted signature and the generated signature do not match, to repeat the looking-up, extracting and comparing using another of the stored offsets.

9. A receiver/decoder as claimed in claim 7, wherein the memory for storing the offset is provided by rewriteable non-volatile memory.

10. A receiver/decoder as claimed in claim 7, wherein the processing means is programmed to generate a respective module signature for each of the modules in the received module MPEG tables, and to compare each module signature in the received MPEG table with the respective module signature generated by the receiver/decoder.

11. A receiver/decoder as claimed in claim 10, wherein the processing means is programmed to inhibit or abort downloading of such a module of the data if the module signature in the received MPEG table and the respective module signature generated at the receiver/decoder for that module do not match each other.

12. A receiver/decoder as claimed in claim 7, wherein the processing means is programmed to inhibit or abort downloading of the data if the or each decrypted signature and the generated signature do not match each other.

13. An MPEG receiver/decoder comprising:

a receiver configured to receive an MPEG table from a transmitter, wherein the MPEG table includes a signature and other data in a block of data, the signature being dissimulated in the data block by using a selected offset between the start of the data block and the start of the signature, wherein the block of data is encrypted using a private key;

a memory for storing a public key corresponding to the private key; and a processor programmed to:

decrypt the encrypted data block in the received MPEG table using the public key, look-up at lest one stored offset in the memory, extract the signature from the decrypted data block using the looked-up offset, generate a signature for the data in the received MPEG table, and compare the signature extracted from the decrypted data block with the signature generated at the receiver/decoder.

\* \* \* \* \*